United States Patent [19]
Fardy

[11] Patent Number: 5,470,092
[45] Date of Patent: Nov. 28, 1995

[54] BICYCLE FRAME

[76] Inventor: Paul Fardy, 3067 Xavier Ct., Oceanside, N.Y. 11572

[21] Appl. No.: 424,888

[22] Filed: Apr. 19, 1995

Related U.S. Application Data

[63] Continuation-in-part of Ser. No. 272,569, Jul. 11, 1994.

[51] Int. Cl.[6] .............................. B62J 7/04; B62K 19/46
[52] U.S. Cl. ...................... 280/288; 280/281.1; 280/202
[58] Field of Search ................................ 280/281.1, 288, 280/274, 202, 264, 284

[56] References Cited

U.S. PATENT DOCUMENTS

| | | | |
|---|---|---|---|
| 2,320,344 | 8/1940 | Belanger | 280/202 |
| 2,755,103 | 7/1956 | Douglas | 280/281.1 |
| 2,944,590 | 11/1958 | Cooper | 280/202 |
| 3,873,127 | 3/1975 | McNichol, Jr. et al. | 280/202 |
| 4,367,829 | 1/1983 | Kusz | 280/202 X |
| 4,440,331 | 4/1984 | Schimmels | 280/202 X |
| 5,090,717 | 2/1992 | Belka | 280/304.5 |

FOREIGN PATENT DOCUMENTS

| | | | |
|---|---|---|---|
| 1037370 | 9/1953 | France | 280/281.1 |
| 374814 | 5/1923 | Germany | 280/281.1 |
| 2831289 | 1/1980 | Germany | 280/281.1 |
| 3240398 | 5/1984 | Germany | 280/281.1 |
| 3700388 | 7/1988 | Germany | 280/281.1 |
| 784223 | 10/1957 | United Kingdom | 280/288 |
| 8605457 | 9/1986 | WIPO | 280/281.1 |

Primary Examiner—Richard M. Camby
Assistant Examiner—F. Zeender

[57] ABSTRACT

A newly designed bicycle frame of the type having two wheels, a seat tube to support a seat post and seat, and a rear wheel lug assembly. This frame, called a "uniframe" has a rectangular frame member with front and rear ends. The front end of the rectangle is connected to the seat tube. The sides of the rectangle are supported by a pair of stays to the front and a pair of stays to the rear. The lower ends of the stays connect to the wheel lugs, two on each side.

2 Claims, 5 Drawing Sheets

Fig. 2 *Prior Art*

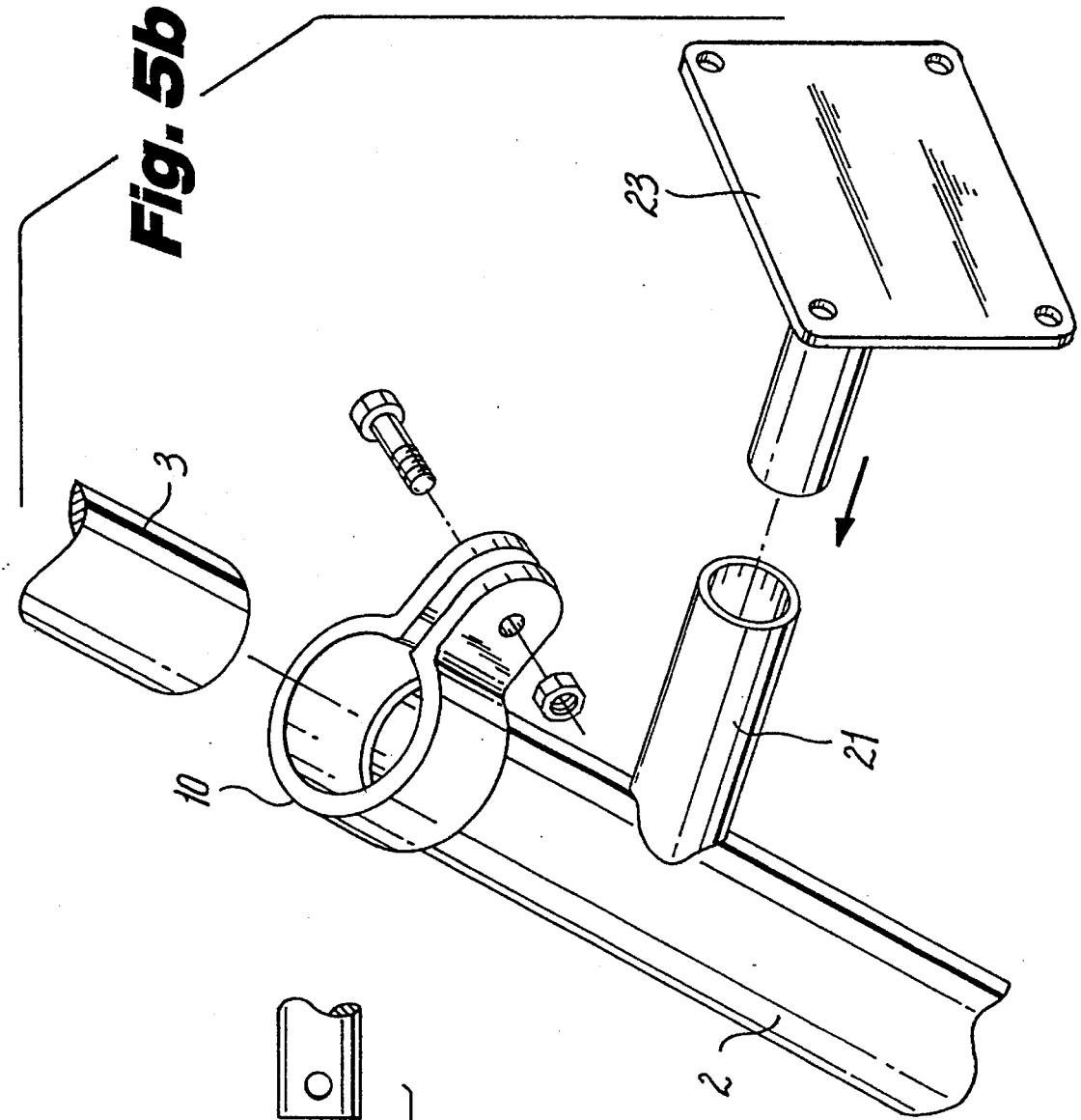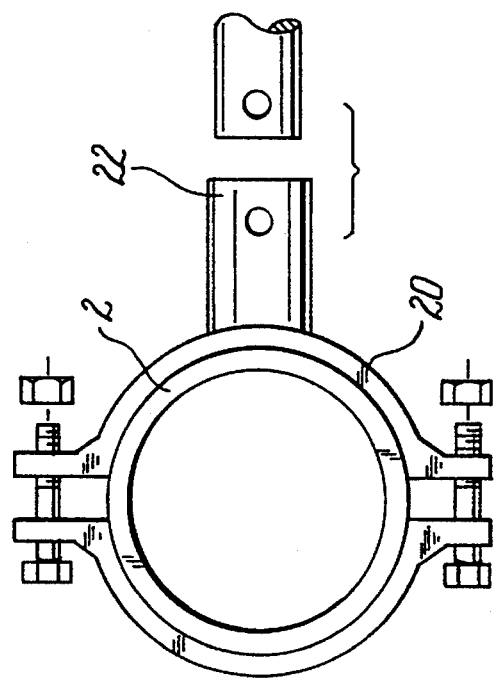

BICYCLE FRAME

This application is a Continuation-In-Part of prior application Ser. No. 08/272,569, filed Jul. 11, 1994.

BACKGROUND

The basic concept of this new type bicycle frame called "uniframe" is to construct a bicycle, using this frame, which will be an improved bicycle:

1. That is superior in riding qualities.
2. That has more utility than just carrying a rider.

What is meant by "superior riding qualities" is more comfortable riding, which goal is accomplished by transmitting less of the severity of road shocks from bumpy or uneven roads to the rider.

What is meant by more "utility" is a sturdier and more useful bicycle frame, having a "built in" part of the bicycle's frame which is also a platform to support a box, trunk, cargo enclosure, or child's seat, and a simple means to quickly remove such added items, but still retain the superior riding qualities outlined above.

This patent application does not include any particular size, shape, or construction material of any box or container as this would be left up to the individual manufacturer. It does, however, include any attachment fittings or accessories that are necessary to the full benefit of the invention of the "uniframe."

At present and to date no bicycle is equipped with a "built in compartment" that might be favorably compared proportionally with an automobile trunk. To carry cargo one must modify the bicycle by bolting on a basket, package carrier, or special metal brackets to carry cargo such as light shopping, extra clothing, books, etc., Bolted on baskets and carriers have these disadvantages:

1. They do not carry cargo in an ideal position for safety as to weight distribution and center of gravity.
2. Bolted on baskets are most often attached to the axle nuts, which assembly tends to bend and loosen the axle, due to vibration and excessive strain on the axle.
3. Cargo carried in baskets, tied or strapped onto carriers is exposed to possible unfavorable weather, whereas containers manufactured for the "uniframe" will be enclosed or possibly even locked.
4. Unlike a standard bicycle front basket, cargo is carried in the rear in a more streamlined configuration and not affecting the bicycle's steering.

THE INVENTION

There are several types of bicycles being manufactured but by far the most popular, with ninety-eight percent of the market, is the conventional rigid frame bicycle. It is the most efficient in weight/strength ratio. Weight is of the utmost importance in a bicycle as it is propelled by human power, many times necessarily up hill.

A second type of bicycle is one with a suspension frame. It utilizes steel springs or air-oil shocks to absorb road bumps. It is heavier because the frame has added parts, very much more expensive, and the vertical travel of the rear wheel interferes with the chain action.

A third type of bicycle is a recumbent, most of which steer by the rear wheel, have no top tube or seat tube, and do not adapt to or conflict with my improvements. The recumbent bicycle is more of a novelty and not for everyday transportation.

The suspension and recumbent bicycles combined are only about two percent of the market. My invention is only to improve the prior art rigid frame.

Conventional rigid frame bicycles are all equipped with seat stays. The "uniframe" equipped bicycle has no seat stays. In riding conventional bicycles then, the bumps in uneven roads transmit such generated shocks straight up the seat stays to a point under the rider's seat. Due to the construction of the "uniframe" much of this shock energy is absorbed and dissipated before it reaches the rider. The uniframe assembly, then, replaces the seat stays of the prior art conventional bicycle. In omitting the seat stays the tubular seat stay brace which attaches to the seat stays is automatically eliminated. This brace also supported the standard rear hand brake. A replacement rear hand brake support which clamps on to the seat tube is used on the "uniframe" as shown in the drawings. Some bicycles using the uniframe frame may be fitted with a rear coaster brake wheel. On such models the clamp-on brake support can be omitted.

To describe the "uniframe": — to the rear of the seat tube extending straight backward is a rectangular section assembly of tubing supported from underneath by four tubular stays that rise from the rear wheel lugs. The rectangular section is installed in a plane generally parallel to level ground and just clear of the top of the rear wheel. The four stays are connected to the rectangular section, two on each side, one front and one rear on each side.

The rectangular section itself is a composite of two parallel longitudinal tubes and two cross tubes. It has a front and a rear and a left and right. One cross tube is installed close to each end, forming a rectangular section. The front is connected to the seat tube by curved extensions of the longitudinal side tubes which curve inwardly and approach the seat tube at a general right angle. This right angle is an important feature.

An aluminum or plastic gusset plate is installed on top of the rectangular section to counter side stresses in the rectangular member. It can be chemically bonded, bolted or riveted to tabs attached on the longitudinal tubes.

All the tubular members are welded together or in some rare cases chemically bonded to form a "uniframe". To make a quick attachable and removable cargo box or container, two bushings are attached to the rectangular section at a rearward point to receive two bolts from the cargo container, said bolts to be secured underneath with wing nuts for quick removal of the cargo container. The front of the cargo container is secured with a tubular slip joint so that with removal of the said rear two bolts the container can be slid back out of the slip joint.

PRIOR ART

There is no known prior art to the uniframe. However, the following patents were cited at an earlier examination of #07,912,479 for possible infringements.

| | | |
|---|---|---|
| #4,440,331 | SHIMMELS | APRIL, 1984 |
| #5,090,717 | BELKA | FEB., 1992 |
| #4,367,829 | KUSZ | JAN., 1983 |
| #3,873,127 | MCNICHOL | MARCH, 1975 |
| #2,320,344 | BELANGER | JUNE, 1943 |
| #2,944,590 | COOPER | JULY, 1960 |

All the above patents are "bolted on" optional accessories to a standard conventional bicycle. The "uniframe" is part of the frame itself.

In Shimmels, the seat stays, which are part of the standard bicycle frame are not part of the patent but are part of the bicycle that the patent "protective child carrier" is to be installed upon. The seat stays are numbered 11 and 13. The "uniframe" has no seat stays.

In Belka, the seat stays are number 5 which are part of the standard bicycle frame to which the "bicycle baggage carrier" is attached. The "uniframe" has no seat stays.

In Kusz, again, the drawing shows the "unit for carrying child and/or cargo," is bolted to the seat stays and seat clamp of a standard bicycle. The "uniframe" has no seat stays.

In McNichol the seat stays of the standard frame are number 24 and the "multi purpose bicycle rack" is bolted to the seat post bolt and rear axle nuts of the standard bicycle frame. The "uniframe" has no seat stays.

In Belanger, as with the others, he has seat stays but he has no numbers on the drawings of the seat stays. The "uniframe" has no seat stays.

Cooper uses the number 6 for the seat stays.

The following additional patents were cited under the application 08/272,569

| OHLIN | 8,605,457 | WIPO | 9/86 |
| PHILLIPS | 0784,223 | G. B. | 10/57 |
| KAUFFMANN | 0374,814 | GERMANY | 5/23 |
| BESSET | 1,037,370 | FRANCE | 9/53 |
| LO | 2,248,589 | G. B. | 4/92 |
| RUFF | 2,831,289 | GERMANY | 1/80 |
| SHELOWSKY | 3,700,388 | GERMANY | 7/88 |
| PAPP | 3,240,398 | GERMANY | 5/84 |
| DOUGLAS | 2,755,103 | U. S. | 7/56 |

Re: Ohlin: Ohlin clearly states and features in his abstract and disclosure, and claims that his bicycle frame is an invention that makes possible the placement of the (saddle) seat "as good as vertical above the pedal crank." There is no reference, nor should there be, to better riding quality or better utility. His drawings bear this out. I would comment, however, since this patent was cited, that his theory is unfounded. Contrary to his disclosure the vertical position of the seat would restrict the pressure on the pedals while the rider was on the seat. By pushing straight down on the pedals the rider could only press down hard enough until his leg pressure equalled his own weight. More pressure would lift his body off the seat limiting his thrust. This is explained in the simple physics law "to every action there is an equal and opposite reaction." When the pedal crank is forward of the seat the rider is pushing more forward than down and the equal reaction is to slide rearward on the seat. This is countered by grasping the handlebars more firmly. Another fallacy in his drawing of the frame's front end is: if a bicycle was constructed with a vertical head tube as shown making the center line of the front wheel vertical there would be very poor control of the steering. The head tube must slant forward to put "rake" in the fork for stability. The rear of the bicycle as drawn would definitely not improve the quality of the ride over conventional seat stays by his placement of parts 43, 8, 9.

Re: Phillips: Phillips' patent is still another version of the conventional bicycle frame, including seat stays. The only difference is that the seat stays and top tube are combined in one piece. This is done by lengthening the tubing that is used for a top tube at the seat tube instead of making it in two pieces with welding. Using two tubes for a top tube is not new but was used in the early 1900's. In my frame I have eliminated seat stays altogether. Phillip's disclosure, page 2 line 15, states that the carrier shown is optional, thus it is not part of the frame as a standard item. The carrier, when used, attaches to the seat stays, not the seat tube as in the "uniframe." The "uniframe" eliminates seat stays and the area of the integral part of the frame which serves use as a carrier is directly attached to the seat tube, and approaches the seat tube from the side by curved extensions. These curved extensions are thus subjected to bending and torsion stresses which relieve the energy generated by road shocks.

Re: Kauffmann: any vehicle in the ignited states with two wheels and a motor is considered a motorcycle. It is then not a bicycle. Aside from this classification this vehicle has the conventional seat stays and a motorcycle seat which if installed on a bicycle would improve the riding, but it is not adaptable. Even on this motorcycle the seat is occupying half of the carrier, so there is no utility improvement. There is no resemblance to my bicycle frame.

Re: Besset: Besset clearly uses seat stays, although they are not indicated by number. This frame was not intended to relieve road shocks by any kind of a variation in the rear part of the frame.

Re: Lo: Lo patents a device for mounting a brake caliper on a variation of seat stays. My frame has no seat stays. This device is solely for frames made of composite carbon fibers and is unnecessary on a metal frame as the welding process is easier. If my brake clamp device 20 was used on a carbon fiber composite frame it would still be clamped on the carbon fiber composite frame.

Re: Ruff: Ruff is attempting to introduce an entirely new frame. Unlike my frame and the conventional frame I show in prior art FIG. 1., the ruff frame has no top tube. The absence of the top tube makes the frame of cantilever construction instead of triangulated truss. The result would be an unacceptably heavy frame. One use is to supposedly carry a child in a standing position. The frame would have to be still longer for this purpose and thus still heavier. Carrying cargo in front is undesirable. Also, carrying a child in this manner is dangerous. The rear truss he shows also has no triangulation which would require more heavy tubing, or installing the equivalent of seat stays. Ruff has no seat tube or handbrake caliper installation. This design has no merit and is no improvement over the conventional prior art.

Re: Schelowsky: the Schelowsky patent is clearly a recumbent bicycle. It steers from the rear wheel, has no top tube, does not conflict with my frame design and carries cargo optionally in the front, an undesirable feature.

Re: Papp: This frame has metal springs to soften the bumps in the road. It does help this condition but has several disadvantages. The installation of springs makes this frame a suspension frame, as described under my disclosure heading "the invention," and therefore does not conflict with my invention. The springs, necessary attachment fittings and additional tubing required as can clearly be seen in papp's drawings, add considerable undesirable weight to the bicycle frame. Also obvious in the drawings is the difference in distance between the drive and wheel chain sprockets when the spring is at rest and then compressed at the end of its travel. This creates a rough chain action. My invention is to improve only the rigid frame.

Re: Douglas: This bicycle frame is basically the same as I have in my drawing prior art FIG. 1. The tubes used in this frame are of a curved shape, popular in the 1940's and 1950's as a "streamline" shape strictly for eye appeal at that time. Aside from the assorted reinforcing tubes shown on his drawings this frame still has the standard seat stays that I have eliminated in the "uniframe." The extra tubing parts shown on his drawings were supposed to reinforce the frame for reasons described in Douglas lines 55 to 70, column 1 page 3. No mention in the Douglas disclosure or drawings is made regarding better riding qualities or more utility, nor should there be.

OBJECTS OF THE INVENTION

The principal object of the invention is to provide a new and improved bicycle by the use of the "uniframe." Such a bicycle would have better riding qualities.

Another object of the invention is to provide a bicycle using the "uniframe" that has more utility than a conventional bicycle.

Another object is to provide an improved bicycle frame that will accept the installation of standard bicycle saddle bags without the need for adding extra metal brackets.

Another object is to provide carrying space on a bicycle that is more streamline due to the elimination of the customary front basket. A closed container mounted on a "uniframe" will be more weatherproof in addition to having a quick removable feature of the cargo container when not in use.

These and other objects will be apparent from the specifications and drawings.

BRIEF DESCRIPTION OF THE DRAWINGS

FIGS. 5a and 5b are drawings of optional parts for the "uniframe."

DETAILED DESCRIPTION OF THE INVENTION

Figure 1:
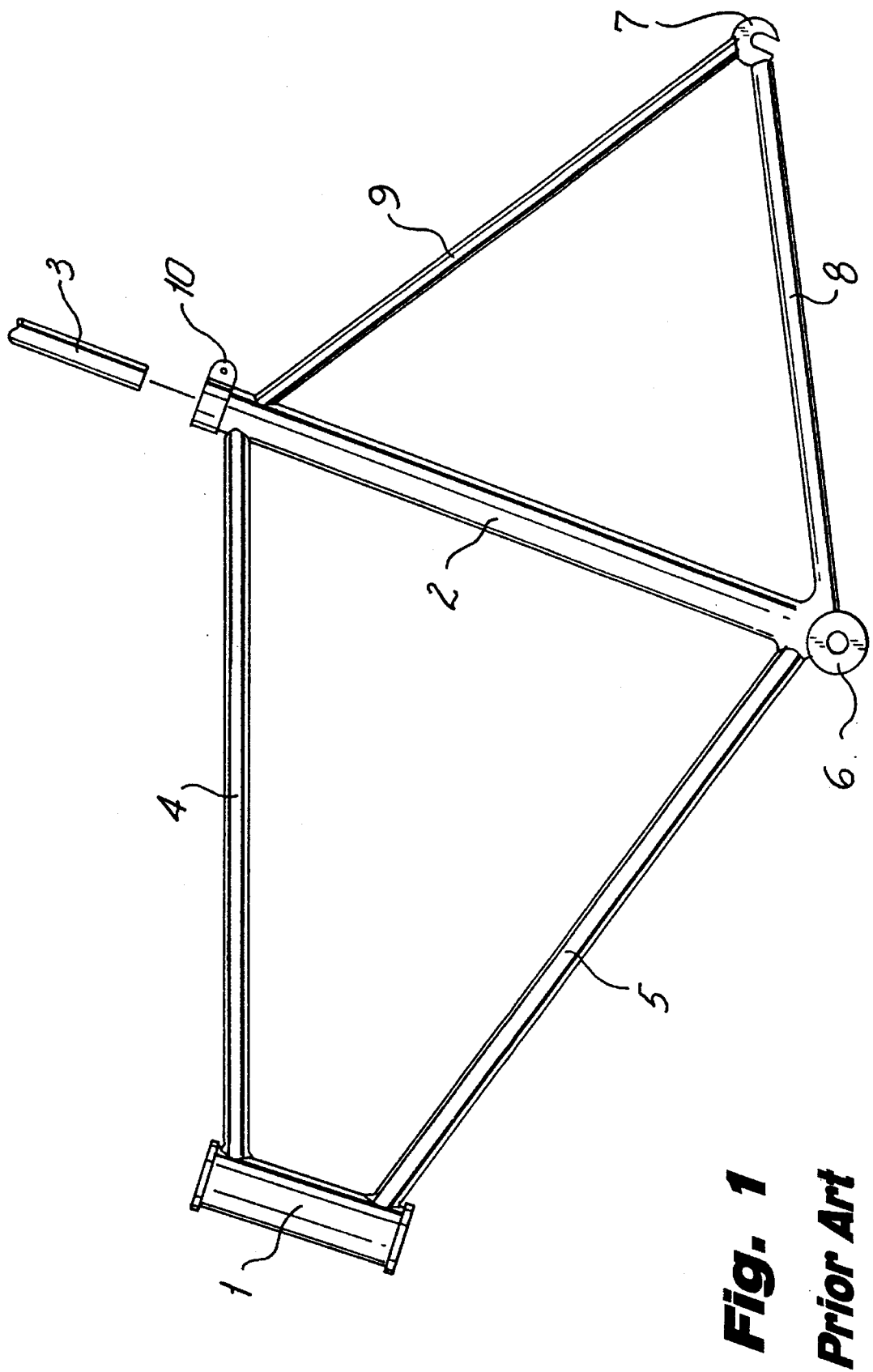
FIG. 1 is a side view of a standard conventional bicycle frame. Also shown is the industry-wide nomenclature of frame parts. This is prior art.
Figure 2:
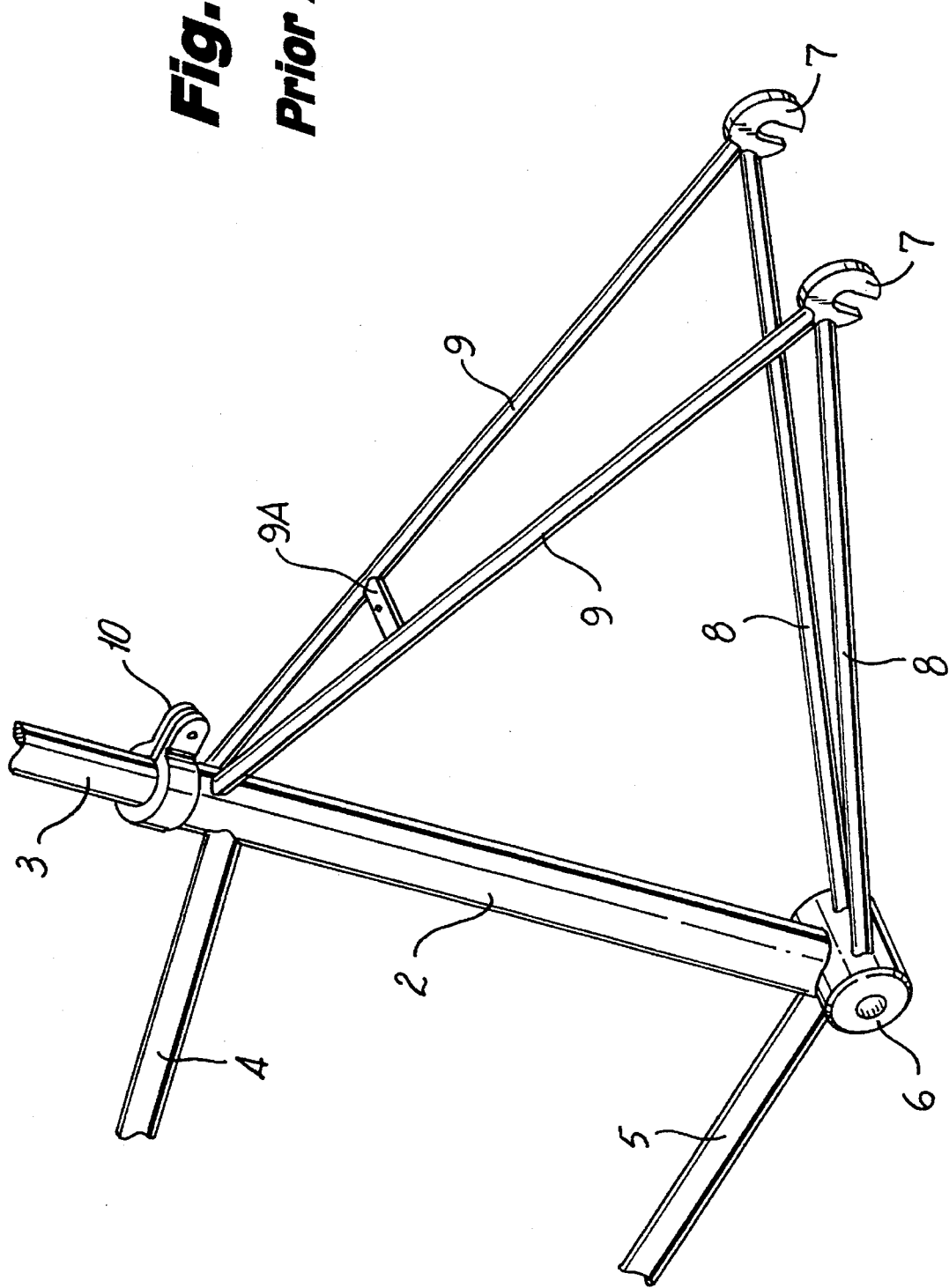
FIG. 2 is a perspective view of the rear section of FIG. 1 in more detail. This is prior art.

FIG. 1 shows a standard conventional bicycle frame having a head tube 1 which is used to support a steerable front fork, front wheel, and handlebar assembly (such parts not shown). Also shown is a seat tube 2 into which can be installed a seat post 3. The head tube 1 and the seat tube 2 are connected to the top tube 4 and a down tube 5. Down tube 5 is also connected to the front side of bottom bracket 6 which houses the pedal axle assembly (not shown). The rear of bottom bracket 6 is connected to two generally parallel chain tubes 8, see FIG. 2, which terminate at and connect to rear wheel lugs 7. Seat stays 9 also connect to rear wheel lugs 7 angle upward and connect to the upper rear of seat tube 2. FIG. 2 also shown is a small cross tube 9a which braces the seat stays 9 and serves as a rear hand brake support on the conventional bicycle when hand brakes are installed. A hole in the center of 9a accepts a standard rear hand brake. There are several such hand brakes manufactured all of which are capable of fitting on 9a.

Figure 3:
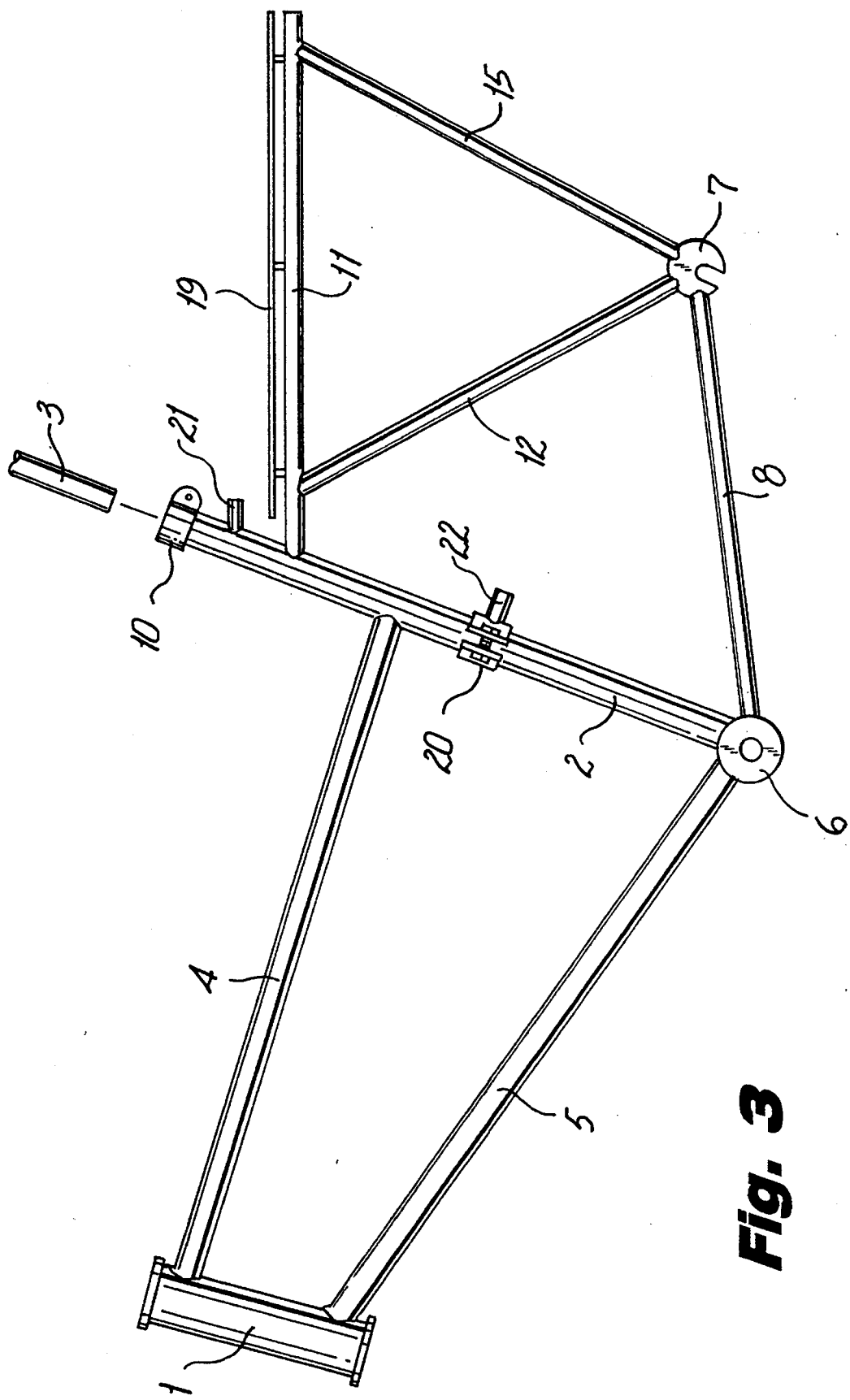
FIG. 3 is a side view of a bicycle with the embodiment of the invention called a "uniframe."
Figure 4:
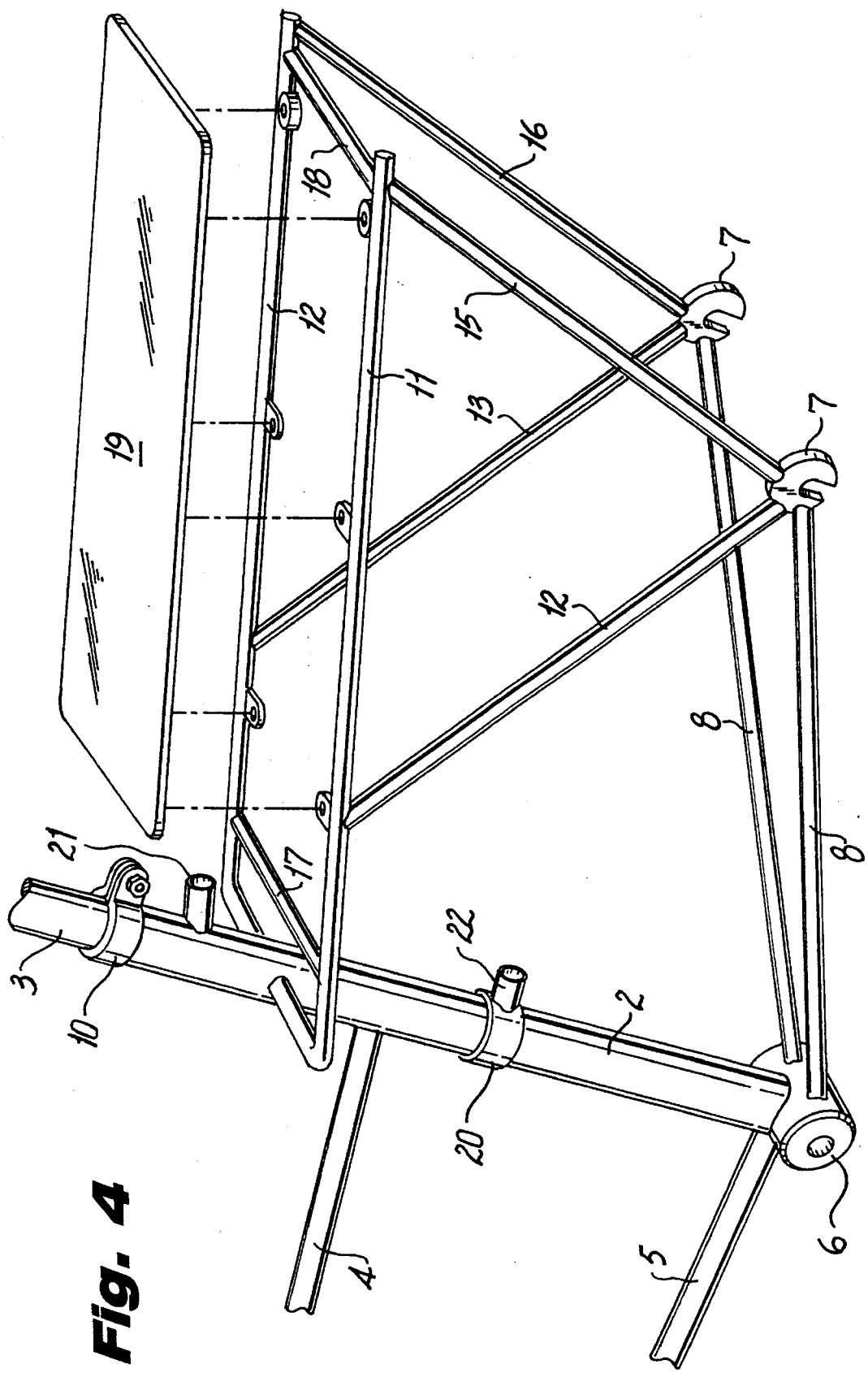
FIG. 4 is a perspective view of the rear section of FIG. 3 in more detail.

In FIGS. 3 and 4, the embodiment of the invention, the seat stays 9 and 9a are eliminated. The chain tubes 8 are retained. In place of the seat stays is a rectangular assembly, having a front and a rear. Two longitudinal tubes, parallel and extending rearward, and two cross tubes between them at right angles numbered 17 and 18 make the rectangle. The longitudinal tubes curve inwardly at the front and connect to the seat tube 2 at generally right angles. Also attached to the longitudinal tubes 11 and 12 are small metal tabs and bushings to accept the gusset plate 16. This sheet metal or plastic gusset plate is for reinforcement of the rectangular assembly, and to facilitate the mounting of any box or container thereon. The gusset plate 16 also functions as a rear fender to the bicycle. Also shown in FIGS. 3 and 4 is a new position for the top tube 4 of prior art drawings FIGS. 1 and 2 the newly positioned top tube 4 permits a rider's easier mounting of the bicycle when a box or container is installed on the "uniframe." Tube 4 is installed slightly below the rectangular member connection. This is done to help to eliminate any residual road shock energy without compromising the integrity of the truss.

FIG. 5 shows a top view of a removable clamp-on assembly 20 used on the "uniframe" for the mounting of a standard bicycle rear hand brake caliper. Also shown is the slip tube quick removable assembly 23 which attaches to the front of any box or trunk a manufacturer might wish to install or quickly remove on the uniframe equipped bicycle. Its tubular female mating part 21 is attached to seat tube 2 as shown. FIG. 5 also shows a standard bicycle seat post clamp 10. This tightens seat post 3 in place and is mainly shown to illustrate the area of the seat tube where these parts are located.

It is claimed:

1. A one unit bicycle frame for a bicycle having two wheels in line, with a front steerable wheel, and having a head tube, top tube, down tube, seat tube, and a seat post for supporting a seat, and chain tubes with rear wheel lugs: said one unit bicycle frame having a horizontal rectangular structurally integral member located over the rear wheel and generally parallel to the ground, and having a front cross tube, a rear cross tube, and left and right longitudinal side members, the left and right side members having curved extensions curving inwardly and connected to the seat tube at a generally right angle to a longitudinal axis of the bicycle frame, with said longitudinal side members being spaced by, and connected together by said front and rear cross tubes at right angles to the longitudinal side members, and said rectangular member having a gusset plate installed on its top, secured with a fastener through holes on the periphery of the gusset plate into tabs provided with holes, said tabs located on the longitudinal side members, and said rectangular member being supported from underneath in a position parallel to the ground by left and right first downward tubes connected respectively to the front underside of the left and right longitudinal side members at a position rearward of the curved extensions and left and right second-downward tubes connected respectively to the rear underside of the left and right longitudinal side members, with the first and second downward tubes terminating at and connecting to respective left and right rear wheel lugs.

2. A bicycle frame as in claim 1 having a removable and adjustable clamp assembly to fit on the seat tube with a tubular extension on said clamp assembly having a hole for accepting and supporting in place a standard bicycle rear hand brake caliper.

* * * * *